US009541722B2

(12) United States Patent
Sajima et al.

(10) Patent No.: US 9,541,722 B2
(45) Date of Patent: Jan. 10, 2017

(54) OPTICAL FIBER RIBBON AND OPTICAL FIBER CABLE

(71) Applicants: FUJIKURA LTD., Tokyo (JP); NIPPON TELEGRAPH AND TELEPHONE CORPORATION, Tokyo (JP)

(72) Inventors: Yoshie Sajima, Yotsukaido (JP); Takashi Matsuzawa, Sakura (JP); Mizuki Isaji, Chiba (JP); Ken Osato, Sakura (JP); Naoki Okada, Yotsukaido (JP); Hisaaki Nakane, Tsukuba (JP); Yusuke Yamada, Tsukuba (JP); Daisuke Kakuta, Tsukuba (JP); Shinya Hamaguchi, Tsukuba (JP); Yukihiko Shibata, Tsukuba (JP)

(73) Assignees: FUJIKURA LTD., Tokyo (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 14/889,058

(22) PCT Filed: Apr. 28, 2014

(86) PCT No.: PCT/JP2014/061867
§ 371 (c)(1),
(2) Date: Nov. 4, 2015

(87) PCT Pub. No.: WO2014/181730
PCT Pub. Date: Nov. 13, 2014

(65) Prior Publication Data
US 2016/0070079 A1 Mar. 10, 2016

(30) Foreign Application Priority Data

May 7, 2013 (JP) ................................. 2013-097510

(51) Int. Cl.
*G02B 6/44* (2006.01)

(52) U.S. Cl.
CPC ........... *G02B 6/4404* (2013.01); *G02B 6/4495* (2013.01); *G02B 6/4498* (2013.01)

(58) Field of Classification Search
CPC .... G02B 6/4404; G02B 6/4498; G02B 6/4495
See application file for complete search history.

(56) References Cited

U.S. PATENT DOCUMENTS 6,243,523 B1 6/2001 Aloisio et al.
2014/0314382 A1 10/2014 Sato et al.

FOREIGN PATENT DOCUMENTS

JP 6-181009 A 6/1994
JP 2000-147340 A 5/2000
(Continued)

OTHER PUBLICATIONS

Dicision of Refusal for Japanese Patent Application No. 2013-097510, dated Jun. 9, 2015.
(Continued)

*Primary Examiner* — Ryan Lepisto
(74) *Attorney, Agent, or Firm* — Sughrue Mion, PLLC

(57) ABSTRACT

An optical fiber ribbon includes a plurality of optical fiber cores arranged in parallel spaced from each other; and a tape forming member having a coating portion covering an outer circumference of the optical fiber cores, and a coupling portion, integrally formed with the coating portion, intermittently coupling adjacent optical fiber cores, wherein the coating portion has an opening portion to expose a part of surfaces of the optical fiber cores, and at least a part of the coating portion is continuous in a longitudinal direction of the optical fiber cores.

14 Claims, 5 Drawing Sheets

(56) References Cited

FOREIGN PATENT DOCUMENTS

| JP | 2003-232972 A | | 8/2003 |
|---|---|---|---|
| JP | 2003-241039 A | | 8/2003 |
| JP | 2003-241041 A | | 8/2003 |
| JP | 2003232972 A | * | 8/2003 |
| JP | 2007-272006 A | | 10/2007 |
| JP | 2007-279226 A | | 10/2007 |
| JP | 4143651 B2 | | 9/2008 |
| JP | 2009-244589 A | | 10/2009 |
| JP | 2013-50739 A | | 3/2013 |
| JP | 2013-182146 A | | 9/2013 |
| JP | 2014-85512 A | | 5/2014 |

OTHER PUBLICATIONS

Notification of Reasons for Refusal for Japanese Patent Application No. 2013-097510, dated Nov. 25, 2014.
Notification of Reasons for Refusal for Japanese Patent Application No. 2013-097510, dated Mar. 10, 2015.
International Search Report of PCT/JP2014/061867, dated Aug. 12, 2014. [PCT/ISA/210].
Written Opinion of PCT/JP2014/061867, dated Aug. 12, 2014. [PCT/ISA/237].
Communication dated Feb. 18, 2016, from the New Zealand Intellectual Property Office in counterpart application No. 714253.
Communication dated Jun. 8, 2016, issued by the Australian Patent Office in corresponding Australian Application No. 2014263643.
Communication dated Jul. 26, 2016 from the Canadian Intellectual Property Office in counterpart Application No. 2,911,402.
Communication dated Aug. 8, 2016 from the Australian Intellectual Property Office in counterpart application No. 2014263643.
Communication dated Nov. 10, 2016, issued by the European Patent Office in corresponding European Application No. 14794615.6.

* cited by examiner

FIG. 6
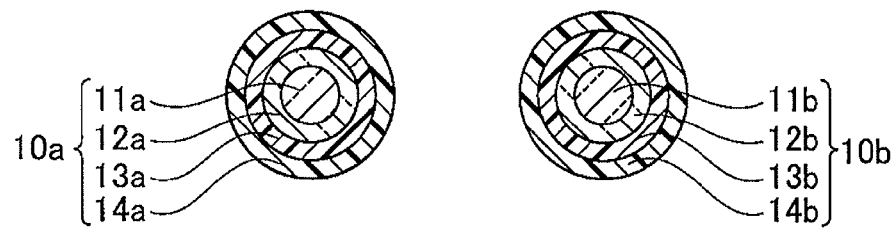
FIG. 7
| CROSS-SECTION EXPOSURE ANGLE [°] | COATING REMOVAL TIMES [NUMBER] |
|---|---|
| 90 | 3 |
| 15 | 5 |
| 0 | 15 |
FIG. 8
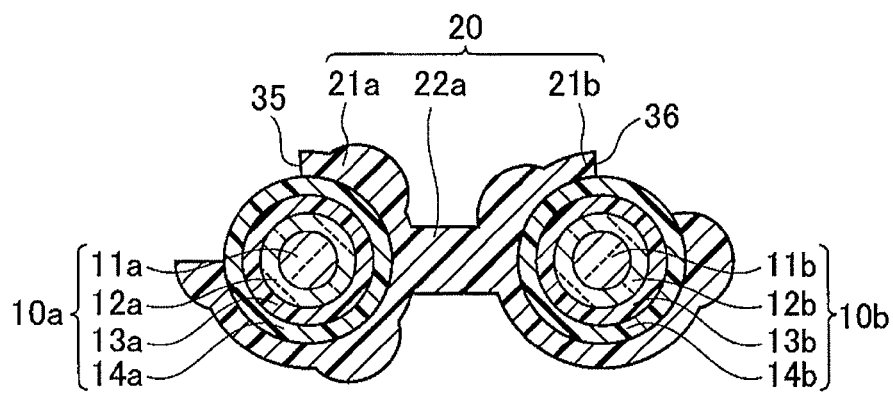

OPTICAL FIBER RIBBON AND OPTICAL FIBER CABLE

CROSS REFERENCE TO RELATED APPLICATIONS

This application is a National Stage of International Application No. PCT/JP2014/061867 filed Apr. 28, 2014, claiming priority based on Japanese Patent Application No. 2013-097510, filed May 7, 2013, the contents of all of which are incorporated herein by reference in their entirety.

TECHNICAL FIELD

The present invention relates to an optical fiber ribbon of an intermittently fixed type in which adjacent optical fiber cores are intermittently fixed, and an optical fiber cable.

BACKGROUND ART

In recent years, in an optical fiber cable, the desires of a higher density and a thinner diameter have been increased. In order to attain the ultimate thin diameter, it is more advantageous to gather optical fiber cores each having a single core together than a structure of the optical fiber ribbon. However, in a case that the optical fiber cores each having the single core are gathered together, there is a problem that a connecting workability may be deteriorated, for example, such that a batch fusion splicing is impossible.

In order to solve this problem, in the optical fiber ribbon having two or more optical fiber cores arranged in parallel to each other, the optical fiber ribbon of an intermittently fixed type in which a plurality of coupling portions coupling only the optical fiber cores adjacent to each other are arranged two-dimensionally and intermittently in a longitudinal direction and a width direction of the optical fiber cores has been proposed (for example, refer to patent documents 1 to 5).

In addition, by the expansion of recent FTTH (Fiber To The Home), the optical fiber ribbon often has been separated into single cores to connect to each of the optical fiber cores each having single core.

When this connecting work is carried out, an outer diameter of the coating of the optical fiber core becomes larger than a hole diameter of a mechanical splice or a field assembled connector if a tape forming member is left on the outer circumference of the optical fiber core having the single core, and thus, things may occur where the optical fiber core may not be inserted into those hole portions. Hence, after separating the optical fiber ribbon into the single core, processing for removing the tape forming member on the surface of the optical fiber core is required.

PRIOR ART DOCUMENT

Patent Document

[Patent Document 1] JP 2007-279226A
[Patent Document 2] JP 2003-241041A
[Patent Document 3] JP 4143651B
[Patent Document 4] JP H06-181009A
[Patent Document 5] JP 2003-232972A

DISCLOSURE OF INVENTION

However, in the optical fiber ribbon united by the coupling portions of the tape forming member, in which the adjacent optical fiber cores are arranged in parallel spaced from each other and the tape forming member covers the outer circumference of each optical fiber cores, since the entire circumference of the optical fiber core is covered with the tape forming member after the single core separation, it is difficult to remove the tape forming member even if the adhesion of a colored layer of the optical fiber core and the tape forming member is made lower.

Also, even if a special removing tool is used, removing solely between the tape forming member and the colored layer is possible, but, since the entire circumference of the optical fiber core is covered with the tape forming member, it is difficult to remove the tape forming member.

In view of the foregoing problems, an object of the present invention is to provide an optical fiber ribbon and an optical fiber cable capable of easily removing a tape forming member after single core separation.

An aspect of the present invention provides an optical fiber ribbon including a plurality of optical fiber cores arranged in parallel spaced from each other; and a tape forming member having a coating portion covering an outer circumference of the optical fiber cores, and a coupling portion, integrally formed with the coating portion, intermittently coupling adjacent optical fiber cores, wherein the coating portion has an opening portion to expose a part of surfaces of the optical fiber cores, and at least a part of the coating portion is continuous in a longitudinal direction of the optical fiber cores.

Another aspect of the present invention provides an optical fiber cable implementing the foregoing optical fiber ribbon.

According to the present invention, it is possible to provide the optical fiber ribbon and the optical fiber cable capable of easily removing the tape forming member after the single core separation.

BRIEF DESCRIPTION OF DRAWINGS

FIG. 6 is a cross-sectional view of the optical fiber ribbon following FIG. 5 during the single core separation according to the embodiment of the present invention;

FIG. 7 is a table presenting examples of cross-section exposure angles and coating removal times according to a third example of the embodiment of the present invention.

FIG. 8 is a cross-sectional view perpendicular to a longitudinal direction of the optical fiber ribbon according to the other embodiment of the present invention.

DESCRIPTION OF EMBODIMENTS

Figure 1:
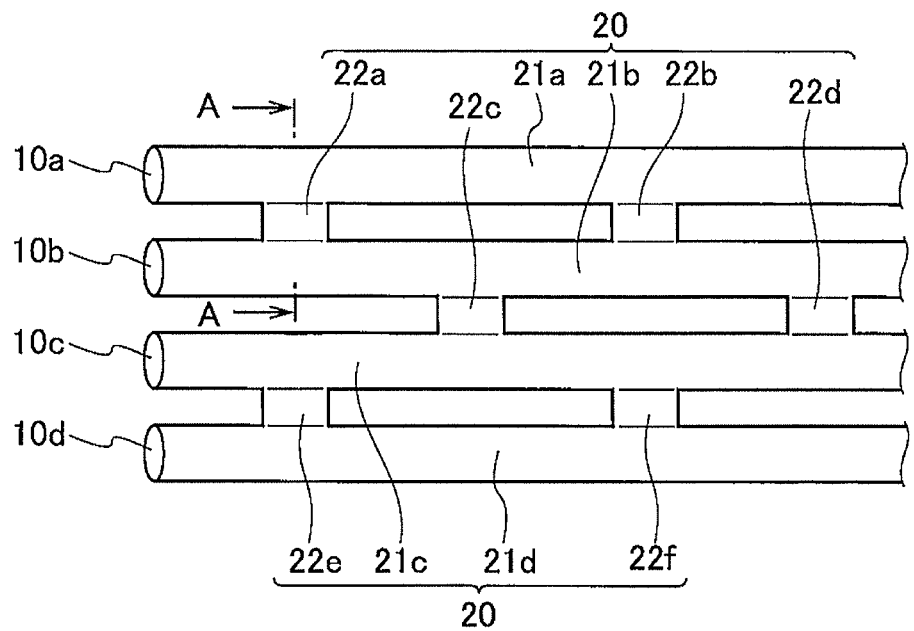
FIG. 1 is a top view illustrating an example of an optical fiber ribbon according to an embodiment of the present invention.

Various embodiments of the present invention will be described with reference to the accompanying drawings. In the following description of the drawings, same or similar parts are given same or similar reference numerals. However, it is noted that the drawings are schematic and that the relationship between thickness and planar dimensions, the proportion of thicknesses of layers, and the like are different from real ones. Accordingly, specific thicknesses and dimensions should be determined with reference to the following description. It is certain that some portions have different dimensional relations and proportions between the drawings.

Also, the following embodiments show devices and methods to embody the technical idea of the invention by way of example. The technical ideas of the invention do not limit the materials, shapes, structures, arrangements, and the like of the constituent components to those described below. The technical idea of the invention can be variously changed within the scope of the claims.

As shown in FIG. 1, an optical fiber ribbon according to an embodiment of the present invention includes a plurality of (four) optical fiber cores 10a to 10d extending in parallel and spaced from each other, coating portions 21a to 21d covering outer circumferences of the optical fiber cores 10a to 10d, respectively, and a tape forming member (outer coating) 20 having coupling portions 22a to 22f, which are integrally formed with the coating portions 21a to 21d and intermittently couple the adjacent optical fiber cores 10a to 10d, respectively. In addition, although not shown in FIG. 1, each of the coating portions 21a to 21d of the tape forming member 20 has an opening portion so as to expose a part of a surface of each of the optical fiber cores 10a to 10d.

Figure 2:
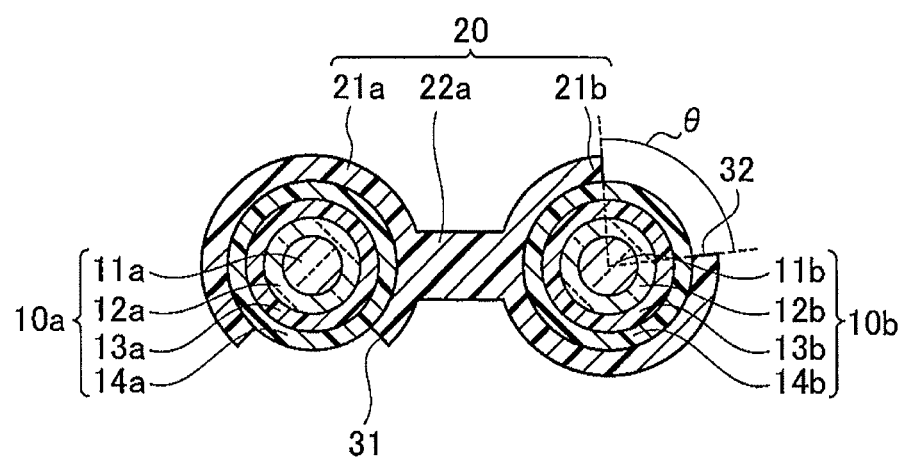
FIG. 2 is a cross-sectional view taken along line A-A in FIG. 1.

As shown in FIG. 2, the optical fiber cores 10a, 10b have cores 11a, 11b and clads 12a, 12b which are made of quartz, coating layers 13a, 13b made of ultraviolet curing resin covering outer circumferences of the clads 12a, 12b, and colored layers 14a, 14b made of ultraviolet curing resin covering outer circumferences of the coating layers 13a, 13b, respectively. The optical fiber cores 10c, 10d shown in FIG. 1, also have the same structures as the optical fiber cores 10a, 10b. Hereafter, description will be given by focusing attention on the optical fiber cores 10a, 10b.

For the material of the tape forming member 20, not only an ultraviolet curing resin, such as urethane acrylate, epoxy acrylate and the like, but also a thermoplastic resin, a thermo-setting resin or the like may be used. A thickness of the coupling portion 22a of the tape forming member 20 may be thicker or thinner than each thickness of the coating portions 21a, 21b. The thickness of the coupling portion 22a is about 1 µm to about 120 µm, and each thickness of the coating portions 21a, 21b is about 1 µm to about 15 µm.

Figure 3:
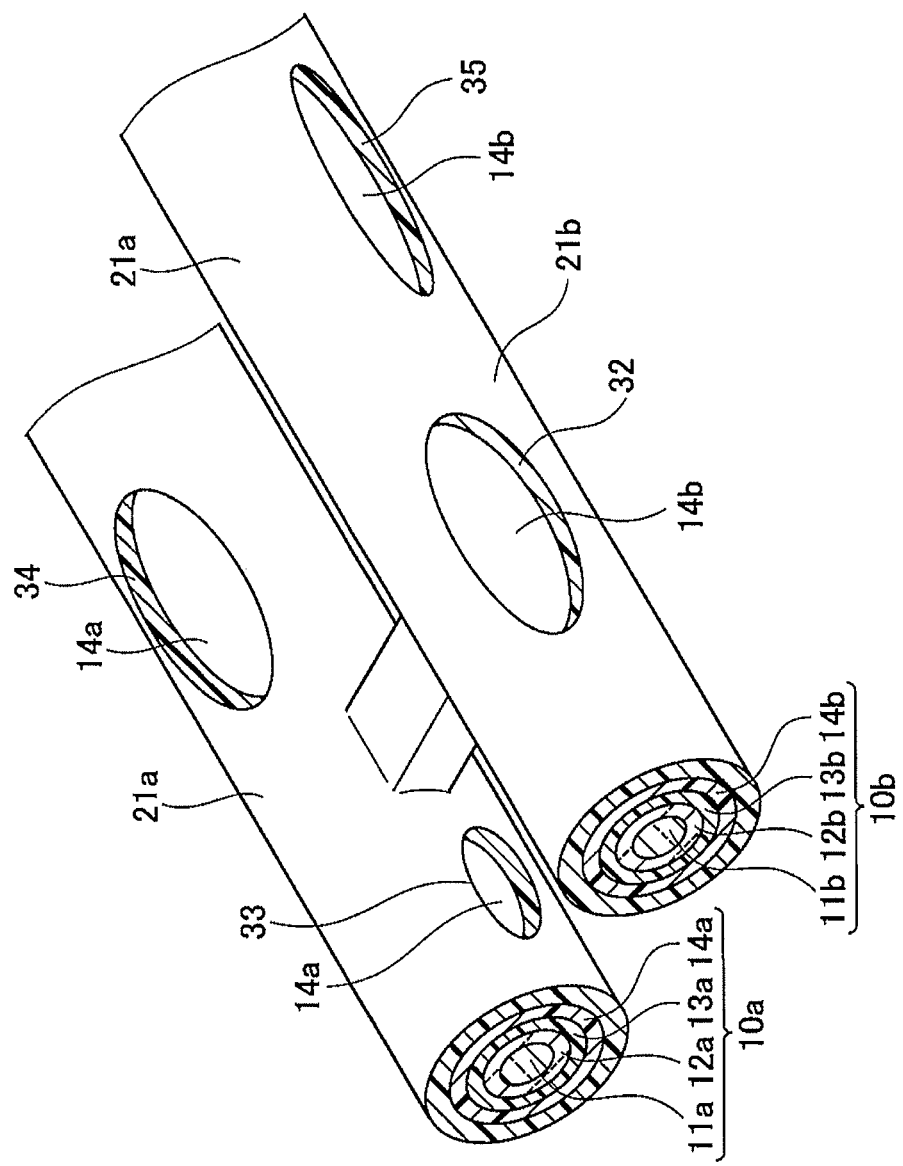
FIG. 3 is a perspective view illustrating an example of the optical fiber ribbon according to the embodiment of the present invention.

As shown in FIGS. 2 and 3, the coating portions 21a, 21b of the tape forming member 20 have opening portions 31 to 35 to expose a part of the surfaces of the colored layers 14a, 14b of the optical fiber cores 10a, 10b. Shapes, sizes, layout patterns, numbers and the like of the opening portions 31 to 35 are not limited in particular. Each shape of the opening portions 31 to 35 may be elliptic as shown in FIGS. 2 and 3, and may be circular or rectangular. Also, when each shape of the opening portions 31 to 35 is an ellipse having a major axis in a longitudinal direction of the optical fiber cores 10a, 10b, the major axis is, for example, about 10 µm to about 500 µm.

The opening portions 31 to 35 in FIGS. 2 and 3, are illustrated as being provided irregularly, however the opening portions 31 to 35 may be provided regularly. For example, the opening portions may be provided in a linear shape or a spiral shape in the longitudinal direction of the optical fiber cores 10a, 10b periodically with an equal interval.

Additionally, for an appearance pattern of the opening portion in the longitudinal direction per each single core of the optical fiber cores, it is preferable to be at least one for each coating removal length (for example, 5 cm) after the single core separation.

Moreover, the opening portions 31 to 35 may be provided as being biased to one side of each surface of the coating portions 21a, 21b, or may be provided on both sides in the longitudinal direction of the optical fiber cores 10a, 10b so as to be not biased to the one side.

Furthermore, an angle (cross-section exposing angle) θ for exposing the surfaces of the optical fiber cores 10a, 10b through the opening portions 31 to 35, is preferably larger in view of reducing the coating removal times after the single core separation. The cross-section exposing angle θ is preferably 15° or more, and it is possible to significantly reduce the coating removal times after the single core separation when the cross-section exposing angle θ is 15° or more. Also, the cross-section exposing angle θ is preferably 270° or less, in order to secure the separation strength of the coupling portion 22a. Note that the cross-section exposing angle θ is defined as an angle between two straight lines that connect the centers of the optical fiber cores 10a, 10b to the ends of the opening portions 31 to 35 in the widest portions of the opening portions 31 to 35 in the circumferential direction.

The coating portions 21a, 21b are provided without discontinuity in the longitudinal directions of the optical fiber cores 10a, 10b, and at least a part of the coating portions 21a, 21b is continuous in the longitudinal directions of the optical fiber cores 10a, 10b. That is, in any cross-section perpendicular to the longitudinal directions of the optical fiber cores 10a, 10b, a part or all of the surfaces of the colored layers 14a, 14b are covered by the coating portions 21a, 21b.

Figure 4A:
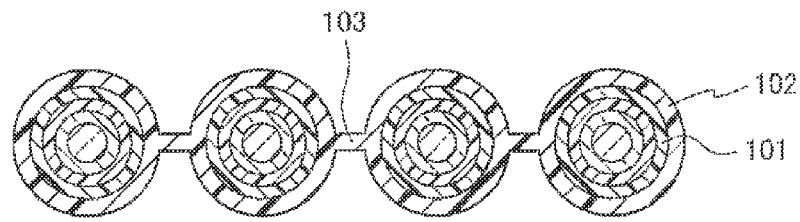
FIG. 4(a) is a cross-sectional view perpendicular to a longitudinal direction of the optical fiber ribbon during single core separation of a comparative example.
Figure 4B:
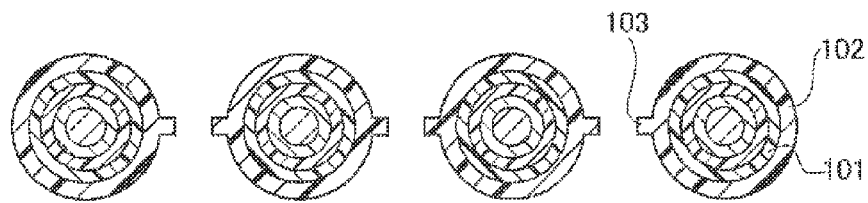
FIG. 4(b) is a cross-sectional view of the optical fiber ribbon following FIG. 4(a) during the single core separation of the comparative example.

Here, description of comparable example will be given with reference to FIGS. 4(a) and 4(b). In an optical fiber ribbon, as shown in FIG. 4(a), in which adjacent optical fiber cores 101 are arranged in parallel spaced from each other and integrally formed by the tape forming member having coating portions 102 for covering the optical fiber cores 101 and coupling portions 103, cutting is carried out at the coupling portion 103 when separating into single cores, as shown in FIG. 4(b). As a result, since the coating portion 102 of the tape forming member covers the entire circumference of each optical fiber core 101, it is difficult to remove the coating portion 102, even if the adhesion between the surface of the optical fiber core 101 and the coating portion 102 is made poor.

Figure 5:
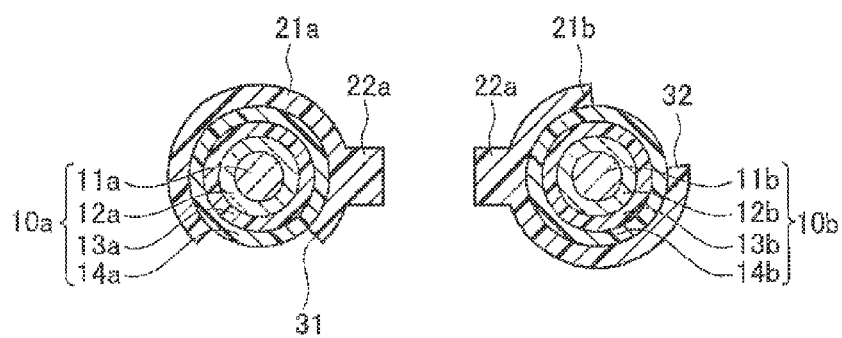
FIG. 5 is a cross-sectional view perpendicular to a longitudinal direction of the optical fiber ribbon during single core separation according to the embodiment of the present invention.

On the contrary, in the optical fiber cores 10a, 10b according to the embodiment of the present invention, as shown in FIGS. 2 and 3, the opening portions 31 to 35 are provided on the coating portions 21a, 21b of the tape forming member 20 preliminarily prior to the single core separation, and a part of the surfaces of the colored layers 14a, 14b of the optical fiber cores 10a, 10b are exposed. Therefore, as shown in FIG. 5, after the coupling portion 22a has been cut away during the single core separation, the coating portions 21a and 21b may be easily peeled off from the opening portions 31 to 35 when rubbing the coating portions 21a, 21b by a removing tool having a abrasive paper or a brush portion, and thus, it is possible to easily remove the coating portions 21a, 21b as shown in FIG. 6.

(Manufacturing Method of Optical Fiber Ribbon)

As an example of a manufacturing method of the optical fiber ribbon according to the embodiment of the present invention, a plurality of optical fiber cores 10a to 10d are run in parallel to each other, and an ultraviolet curing resin is coated on predetermined positions. Then, the ultraviolet curing resin is cured by irradiating ultraviolet, and thereby coupling portions 22a to 22f intermittently fixing the adjacent optical fiber cores 10a to 10d and the coating portions 21a to 21d covering the optical fiber cores 10a to 10d are formed.

Here, by adjusting the supply amount of the ultraviolet curing resin applied to the optical fiber cores 10a to 10d, it is possible to form opening portions 31 to 35 on the coating portions 21a to 21d.

Also, shapes, sizes, layout patterns, numbers and the like of the opening portions 31 to 35 may be arbitrarily controlled by adjusting the supply amount of the ultraviolet curing resin applied to the optical fiber cores 10a to 10d or adjusting a shape of a coating dice or a shutter, and the like.

First Example

As a first example, by using colored optical fiber cores each having a diameter of 250 μm, an intermittently fixed type optical fiber ribbon (sample A) having four cores in which opening portions have been provided in coating portions of a tape forming member so as to expose a part of each colored layer of the colored optical fiber cores, has been prepared. Moreover, as a comparative example, an intermittently fixed type optical fiber ribbon (sample B) having four cores in which coating portions of a tape forming member have covered the entire circumference without exposing colored layers of the colored optical fiber cores, has been prepared.

The single core separation of the prepared samples A, B has been performed. After the single core separation, the optical fiber cores have been rubbed using an abrasive paper (micro poly-net sheet WA-600 (particle size 20 μm), made by KOYOSHA INK), and a number of times of rubbing until the removal of the tape forming member have been measured.

As a result of the measurement, the sample A has been 3 times and the sample B has been 15 times, and it has been found that the sample A is easy to remove the tape forming member in comparison to the sample B.

Second Example

By applying alcohol on the same abrasive paper in the first example, the tape forming member has been removed for the samples A, B similar to the first example, and a number of times of rubbing until the removal of the tape forming member have been measured.

As a result of the measurement, in the sample A, the number of times of rubbing the optical fiber core has been reduced by an average of about 12 times in comparison to the sample B. It is considered that this is because the colored layer and the coating portion have become more easily peeled off by swelling due to the alcohol soaking from an exposed portion of the colored layer where a part of the coating portion has been peeled off during the single core separation.

Third Example

For the sample A similar to the first example, which has been prepared by changing an exposing angle (cross-section exposing angle) of the opening in the coating portion to 90° and 15°, the coating removal times of the tape forming member have been measured after the single core separation, together with the sample B (the cross-section exposing angle is 0°) similar to the first example. As a result, it has been found that, as the cross-section exposing angle is wider, the coating removal times of the tape forming member is reduced, as shown in FIG. 7. In particular, it has been found that, when the cross-section exposing angle is 15° or more, the coating removal times of the tape forming member is dramatically reduced.

Other Embodiment

The present invention has been described through the embodiment as mentioned above. However the descriptions and drawings that constitute a portion of this disclosure should not be perceived as limiting this invention. Various alternative embodiments and operational techniques will become clear to persons skilled in the art from this disclosure.

For example, description has been given using the optical fiber ribbon having four cores in the embodiment of the present invention. However, the number of the optical fiber cores composing the optical fiber ribbon is not particularly limited. Also, the size and kind of the optical fiber core are not particularly limited. For example, a structure that does not have the colored layers 14a, 14b of the optical fiber cores 10a, 10b may be used. Also, pitches and arrangement positions of the coupling portions 22a to 22f are not particularly limited.

Additionally, it may be possible to produce as an optical fiber cable by surrounding the outer circumferences of the optical fiber cores 10a to 10d with cushioning material, such as jelly, yawn and the like, and coating the optical fiber cores 10a to 10d simultaneously together with this cushioning material by a coating layer. The optical fiber ribbon and the optical fiber cable according to the present invention may be used for information communication, and also may be applied to a variety of optical fibers, such as a single mode fiber, a dispersion shifted fiber and the like.

Moreover, as shown in FIG. 3, the coating portions 21a, 21b covering the optical fiber cores 10a, 10b have uniformly smooth surfaces. However, the coating portions 21a, 21b may have are irregularly uneven surfaces, as shown in FIG. 8.

Figure 9:
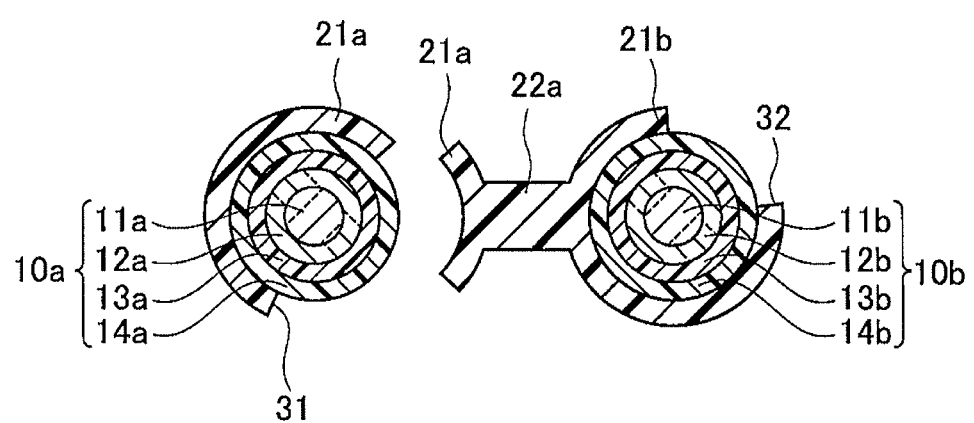
FIG. 9 is a cross-sectional view perpendicular to a longitudinal direction of the optical fiber ribbon during single core separation according to the other embodiment of the present invention.

Moreover, as shown in FIG. 5, the coupling portion 22a between the coating portions 21a, 21b has been cut away during the single core separation. However, as shown in FIG. 9, a part of the coating portion 21a may be cut away during the single core separation without cutting the coupling portion 22a, caused by the thickness of the coupling portion 22a, the thicknesses of the coating portions 21a, 21b, the positions of the openings 31, 32, and the like.

In this manner, the present invention naturally includes various embodiments not specifically mentioned herein. Accordingly, the technical scope of the present invention may be limited only by the inventive features set forth by the scope of the patent claims deemed reasonable from the above description.

The invention claimed is:

1. An optical fiber ribbon comprising:
    a plurality of optical fiber cores arranged in parallel spaced from each other; and
    a tape forming member having coating portions covering each outer circumference of the optical fiber cores, spaced each other, and a coupling portion, integrally formed with the coating portion, intermittently coupling the coating portions each covering adjacent optical fiber cores,
    wherein each thickness of the coupling portions is less than each thickness of the optical fiber cores including the coating portions, and
    each of the coating portions has an opening portion to expose a part of a surface of only a respective one of the optical fiber cores, and at least a part of the coating portion is continuous in a longitudinal direction of the optical fiber cores.

2. The optical fiber ribbon of claim 1, wherein each thickness of the coupling portions is less than each diameter of the optical fiber cores.

3. The optical fiber ribbon of claim 1, wherein each thickness of the coupling portions is 1 µm to 120 µm.

4. The optical fiber ribbon of claim 1, wherein each of the coupling portions are formed between the optical fiber cores.

5. The optical fiber ribbon of claim 1, wherein the opening portions per each single core of the optical fiber cores are formed at least one for each 5 cm in the longitudinal direction.

6. The optical fiber ribbon of claim 1, wherein the tape forming member is formed by an ultraviolet curing resin.

7. The optical fiber ribbon of claim 1, wherein each cross-section exposing angle of the opening portions are 15° or more, and 270° or less.

8. An optical fiber cable implementing an optical fiber ribbon, the optical fiber ribbon comprising:
    a plurality of optical fiber cores arranged in parallel spaced from each other; and
    a tape forming member having coating portions covering each outer circumference of the optical fiber cores, spaced each other, and a coupling portion, integrally formed with the coating portion, intermittently coupling the coating portions each covering adjacent optical fiber cores,
    wherein each thickness of the coupling portions is less than each thickness of the optical fiber cores including the coating portions, and
    each of the coating portions has an opening portion to expose a part of a surface of only a respective one of the optical fiber cores, and at least a part of the coating portion is continuous in a longitudinal direction of the optical fiber cores.

9. The optical fiber cable of claim 8, wherein each thickness of the coupling portions is less than each diameter of the optical fiber cores.

10. The optical fiber cable of claim 8, wherein each thickness of the coupling portions is 1 µm to 120 µm.

11. The optical fiber cable of claim 8, wherein each of the coupling portions are formed between the optical fiber cores.

12. The optical fiber cable of claim 8, wherein the opening portions per each single core of the optical fiber cores are formed at least one for each 5 cm in the longitudinal direction.

13. The optical fiber cable of claim 8, wherein the tape forming member is formed by an ultraviolet curing resin.

14. The optical fiber cable of claim 8, wherein each cross-section exposing angle of the opening portions are 15° or more, and 270° or less.

* * * * *